United States Patent
Weigl (12)

(10) Patent No.: US 6,519,935 B2
(45) Date of Patent: Feb. 18, 2003

(54) DEVICE AND METHOD FOR EXHAUST-GAS AFTERTREATMENT IN AN INTERNAL-COMBUSTION ENGINE

(75) Inventor: Manfred Weigl, Viehhausen (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/054,612

(22) Filed: Jan. 22, 2002

(65) Prior Publication Data

US 2002/0088220 A1 Jul. 11, 2002

Related U.S. Application Data

(63) Continuation of application No. PCT/DE00/02118, filed on Jun. 29, 2000.

(30) Foreign Application Priority Data

Jul. 19, 1999 (DE) .......................... 199 33 798

(51) Int. Cl.[7] .................................. F01N 3/00
(52) U.S. Cl. ......................... 60/286; 60/291; 60/292; 60/295; 60/303
(58) Field of Search .................. 60/286, 274, 295, 60/291, 292, 303, 297

(56) References Cited

U.S. PATENT DOCUMENTS

| | | | |
|---|---|---|---|
| 4,567,773 A | | 2/1986 | Cooper et al. |
| 5,367,875 A | | 11/1994 | Aboujaoude et al. |
| 5,522,218 A | * | 6/1996 | Lane et al. .................... 60/274 |
| 5,884,475 A | | 3/1999 | Hofmann et al. |
| 6,119,448 A | * | 9/2000 | Emmerling et al. .......... 60/274 |
| 6,273,120 B1 | * | 8/2001 | Hofmann et al. ............. 137/98 |
| 6,399,034 B1 | * | 6/2002 | Weisweiler .............. 423/213.2 |
| 6,427,439 B1 | * | 8/2002 | Xu et al. ....................... 60/286 |

FOREIGN PATENT DOCUMENTS

| | | | | |
|---|---|---|---|---|
| DE | 44 32 577 A1 | | 3/1996 | |
| DE | 197 43 337 C1 | | 1/1999 | |
| EP | 0 831 315 A2 | | 3/1998 | |
| EP | 0 905 356 A2 | | 3/1999 | |
| EP | 001176292 A1 | * | 1/2002 | .................. 60/286 |
| JP | 61 073 382 | | 4/1986 | |

* cited by examiner

Primary Examiner—Thomas Denion
Assistant Examiner—Binh Tran
(74) Attorney, Agent, or Firm—Laurence A. Greenberg; Werner H. Stemer; Ralph E. Locher

(57) ABSTRACT

In order to prevent that a liquid reducing agent in a selective catalytic reduction system freezes, there are provided additional resistor heating elements on the pressure sensor diaphragm of the pressure sensor that is present in the reducing agent feed system. The same technique is applied in the production of the heating sensors as in the production of the sensor resistance network. The use of the sensor diaphragm surface for the electrical heating of the liquid reducing agent (e.g., aqueous urea solution) eliminates the need for additional installation space, sealed areas, and connectors for the electrical supply and triggering mechanism.

8 Claims, 2 Drawing Sheets

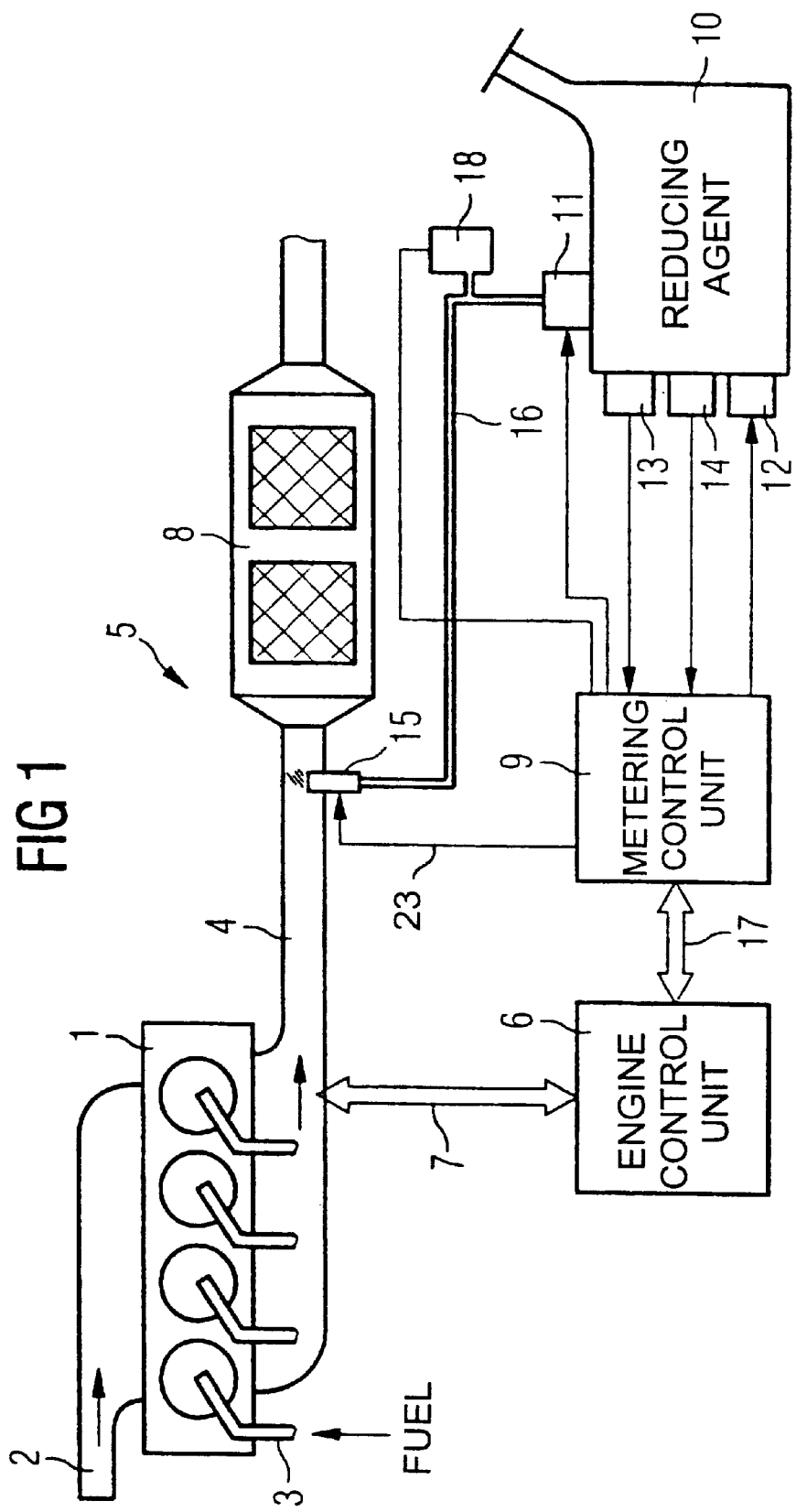

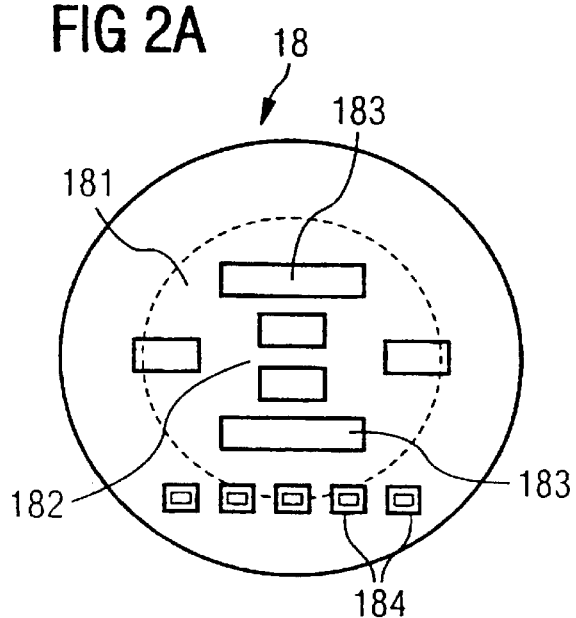
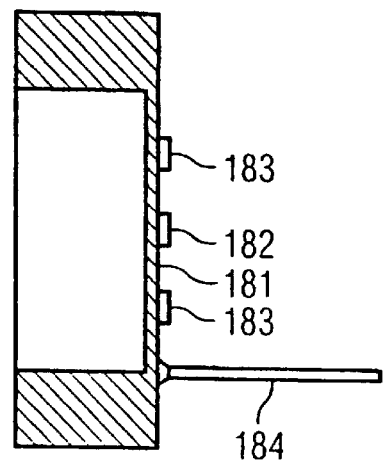
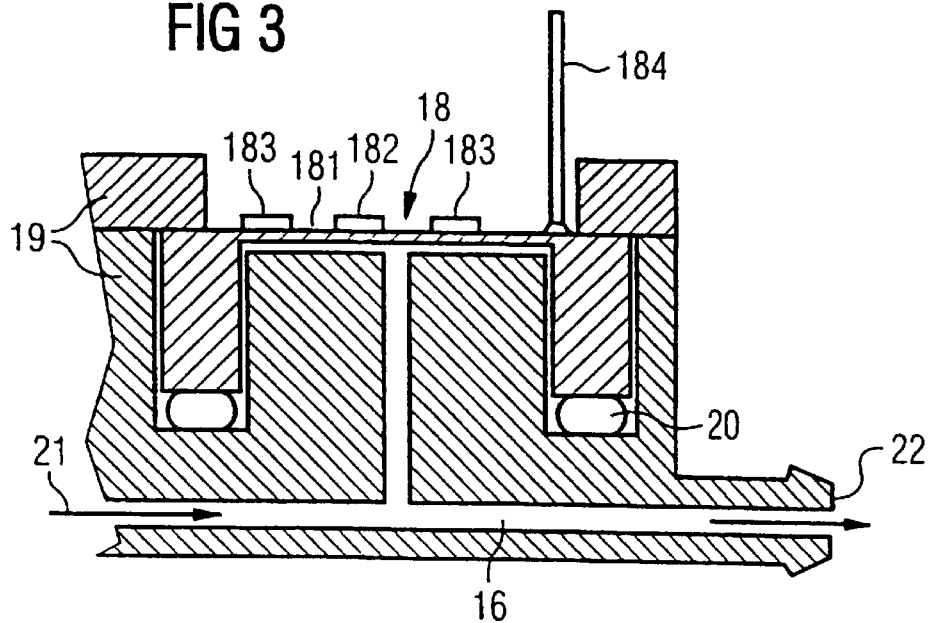

DEVICE AND METHOD FOR EXHAUST-GAS AFTERTREATMENT IN AN INTERNAL-COMBUSTION ENGINE

CROSS-REFERENCE TO RELATED APPLICATION

This application is a continuation of copending International Application No. PCT/DE00/02118, filed Jun. 29, 2000, which designated the United States.

BACKGROUND OF THE INVENTION

Field of the Invention

The invention pertains to a device and a method for exhaust-gas aftertreatment in an internal-combustion engine. The exhaust gas aftertreatment is effected by selective catalytic reduction of nitrogen oxides from the exhaust gas from an internal-combustion engine operating with excess air by introducing a liquid reducing agent.

The nitrogen oxide emissions from an internal-combustion engine, in particular a diesel internal-combustion engine, operating with excess air can be lowered with the aid of the selective catalytic reduction (SCR) technique, in order to form atmospheric nitrogen ($N_2$) and water vapor ($H_2O$). The reducing agent that is used for the purpose is either gaseous ammonia ($NH_3$), ammonia in aqueous solution, or urea in aqueous solution. The urea serves as an ammonia carrier and is injected into the exhaust system with the aid of a metering system, upstream of a hydrolysis catalytic converter, where it is converted into ammonia by means of hydrolysis, and the ammonia in turn reduces the nitrogen oxides in the actual SCR or deNOx catalytic converter.

The important components of a metering system of this type are a reducing-agent vessel, a pump, a pressure regulator, a pressure sensor, and a metering valve. The pump delivers the reducing agent, which is stored in the reducing-agent vessel, to the metering valve, by means of which the reducing agent is injected into the exhaust-gas flow upstream of the hydrolysis catalytic converter. The metering valve is actuated by means of signals from a control device, in such a manner that a specific, currently required quantity of reducing agent is supplied as a function of operating parameters of the internal-combustion engine (see, German patent DE 197 43 337 C1).

It is an advantage of the ammonia-releasing substances which are present in aqueous solutions, such as for example urea, that storage, handling, delivery and metering are relatively simple in technical terms. A drawback of these aqueous solutions is that, depending on the concentration of the dissolved substance, there is a risk of freezing at certain temperatures. 32% strength urea solution, as is typically used as reducing agent in SCR systems, has a freezing point of −11° C. Therefore, devices for heating the metering system have to be provided in order to ensure that all the components of the system are able to function within an acceptable time after the system has been started at ambient temperatures of below −11° C. and to prevent system components from freezing during operation.

One of the main components is the urea pressure sensor. Since this pressure sensor continuously monitors the urea pressure system, and in particular the pressure sensor can be used to detect freezing of the reducing-agent pump, of the connecting hoses or of the metering valve, this pressure sensor has to be reliably thawed and kept frost-free. The pressure sensor element is expediently fitted spatially in the vicinity of the control electronics for the metering system and in the vicinity of the pump outlet. Nevertheless, it is difficult if not impossible to thaw the pressure sensor only by means of the heating of reducing-agent line, reducing-agent pump and the inherent heating of the control electronics.

U.S. Pat. No. 5,884,475 (German published patent application DE 44 32 577 A1) discloses a device for avoiding frost damage to parts of an exhaust-gas cleaning installation which operates on the principle of selective catalytic reduction during stationary periods and for allowing such installations to operate below the freezing point of the reducing-agent solution used. For this purpose, the device has a thermally insulated reservoir for the reducing-agent solution and a feedline which is connected thereto and ends in an outlet opening for the liquid, a nonreturn valve, which can be acted on by a pressurized gas, being provided in the feed line. The reservoir and the feed line can be heated by means of an electrical heater which supplies a heat exchanger with heat.

Japanese patent application JP 61073382 describes a method for temperature compensation in a semiconductor pressure sensor, to the diaphragm surface of which a plurality of resistors are applied, which are used for pressure measurement. To eliminate changes in the ambient temperature from the pressure measurement, compensation resistors are provided. These heater elements are used for temperature compensation in the event of a change in ambient temperature and not to heat the pressure-sensor diaphragm. Therefore, these heater elements are applied outside the sensor diaphragm.

SUMMARY OF THE INVENTION

It is accordingly an object of the invention to provide a device and a method, which overcomes the above-mentioned disadvantages of the heretofore-known devices and methods of this general type and which avoids frost damage to components of an exhaust-gas aftertreatment installation, both during stationary periods and when an installation of this type is operating at temperatures below the freezing point, of the reducing-agent solution used.

With the foregoing and other objects in view there is provided, in accordance with the invention, a device for exhaust gas aftertreatment by selective catalytic reduction of nitrogen oxides in the exhaust gas of an internal-combustion engine operating with excess air, comprising:

a reduction catalytic converter for cleaning the exhaust gas;

a reducing agent vessel for storing a reducing agent to be injected into the exhaust gas, and a reducing agent pump communicating with the reducing agent vessel for delivering the reducing agent;

a metering valve communicating with the reducing-agent pump for introducing the reducing agent into the exhaust gas upstream of the reduction catalytic converter in a flow direction of the exhaust gas;

a metering control unit for controlling an introduction of the reducing agent according to demand; and an electrically heatable pressure sensor for recording a pressure of the reducing agent connected to the metering control unit, the pressure sensor having a pressure-sensor diaphragm and electrical heating resistors for heating the pressure sensor disposed on the pressure sensor membrane.

In accordance with an added feature of the invention, there are provided electrical resistors for recording a temperature of the reducing agent disposed on the pressure sensor diaphragm of the pressure sensor.

In a preferred embodiment of the invention, the sensor membrane is formed of $Al_2O_3$ (alumina).

In accordance with an additional feature of the invention, the pressure sensor is arranged in a feed line connecting the reducing agent pump to the metering valve.

In accordance with another feature of the invention, the pressure sensor and the reducing-agent pump are combined to form a structural unit within a common housing.

With the above and other objects in view there is also provided, in accordance with the invention, a method for exhaust-gas aftertreatment by selective catalytic reduction of nitrogen oxides in the exhaust gas of an internal-combustion engine operating with excess air, the method which comprises:

delivering a liquid reducing agent from a reducing-agent vessel with a reducing-agent pump and, under certain operating states of the internal-combustion engine, metering the reducing agent into the exhaust gas upstream of a reduction catalytic converter with a metering valve;

recording a pressure of the reducing agent with a pressure sensor having a pressure-sensor diaphragm; and upon determining that a temperature of the pressure sensor lies close to or below a freezing point of the reducing agent, heating the pressure sensor with electrical heating resistors disposed on the pressure-sensor diaphragm of the pressure sensor.

In accordance with a further feature of the invention, the temperature of the pressure sensor is recorded with the electrical heating resistors on the pressure-sensor diaphragm. Alternatively, or in addition, the temperature of the pressure sensor is recorded with additional electrical resistors on the pressure-sensor diaphragm.

The idea on which the invention is based is that of using the pressure-sensor diaphragm as a support for heating resistors and for temperature measurement. The technology for production of the sensor resistor network is used to additionally apply heating and temperature-measuring resistors.

The use of the sensor-diaphragm surface for electrical heating of the aqueous urea solution avoids taking up additional space, sealing points and plugs for electrical power supply or control.

The electrical heating resistors enable the sensor diaphragm to be heated directly and therefore enable the availability of the pressure sensor to be ensured as quickly as possible and the pressure of the urea system to be monitored even during the thawing phase.

The additional costs for making the pressure sensor heatable are relatively low, since at most it is necessary to print an additional layer of resistors, and only one additional electrical connection on the sensor element is required.

Since the pressure sensor is in any case electrically connected to the control unit, there are only slight costs for electrical connection of the heating.

If the heating resistors are printed with a thick-film paste with a suitable temperature coefficient, they simultaneously serve as a temperature sensor. Since the pressure sensor is in any case, on account of the temperature compensation, calibrated by laser trimming under controlled temperatures, balancing the temperature sensor entails only insignificant additional costs. On the other hand, if the temperature profile of the pressure sensor is known through measuring of the sensor temperature, it is possible to dispense with temperature compensation, which considerably reduces the overall costs of the sensor. It is also possible for a separate temperature-measuring resistor to be applied for measuring the temperature, which results in higher accuracy of the temperature measurement, since the resistance can be optimized for this application.

Other features which are considered as characteristic for the invention are set forth in the appended claims.

Although the invention is illustrated and described herein as embodied in a device and method for exhaust-gas aftertreatment in an internal-combustion engine, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block diagram illustrating an internal-combustion engine with an associated exhaust-gas aftertreatment installation wherein the pressure sensor according to the invention is used;

FIG. 2A is a diagrammatic plan view of a pressure-sensor diaphragm;

FIG. 2B is a diagrammatic sectional view of the pressure-sensor diaphragm; and

FIG. 3 is a sectional view taken through part of a pump module housing with integrated pressure sensor.

DESCRIPTION OF THE PREFERRED EMBODIMENTS

Referring now to the figures of the drawing in detail and first, particularly, to FIG. 1 thereof, there is shown, in the form of a highly simplified circuit diagram, an internal-combustion engine which is operated with excess air and which has an associated exhaust-gas aftertreatment installation.

Only those parts that are required in order to gain an understanding of the invention are illustrated in the figure. In particular, the fuel circuit is not illustrated. In this exemplary embodiment, a diesel internal-combustion engine is shown as the internal-combustion engine, and aqueous urea solution is used as reducing agent for aftertreatment of the exhaust gas.

The air required for combustion is fed to the internal-combustion engine 1 via an intake line 2. An injection assembly, which may be designed, for example, as a high-pressure storage injection assembly (i.e., common rail) with injection valves, which inject fuel KST directly into the cylinders of the internal-combustion engine 1, is denoted by reference numeral 3. The exhaust gas from the internal-combustion engine 1 flows via an exhaust pipe 4 to an exhaust-gas aftertreatment installation 5 and, from there it is exhausted, via a non-illustrated muffler, into the open air.

To control the internal-combustion engine 1, an engine control unit 6, which is known per se, is connected to the internal-combustion engine 1 via a data and control line 7, which is only diagrammatically illustrated in the drawing. Signals from sensors (e.g. temperature sensors for intake air, charge air, coolant, load sensor, speed sensor) and signals for actuators (e.g. injection valves, control elements) are transmitted between the internal-combustion engine 1 and the engine control unit 6 via the data and control line 7.

The exhaust-gas aftertreatment installation 5 has a reduction catalytic converter 8, which includes a plurality of catalytic converter units that are connected in series and are not denoted in any further detail. In addition, there may be in each case an oxidation catalytic converter arranged downstream and/or upstream of the reduction catalytic converter 8. Furthermore, there is a metering control unit 9, which is assigned to a reducing-agent reservoir or storage vessel 10 with an electrically actuable reducing-agent pump 11 for delivering the reducing agent.

The reducing agent used in this exemplary embodiment is aqueous urea solution which is stored in the reducing-agent storage vessel 10. The vessel has an electrical heater device 12 and sensors 13, 14 which record the temperature of the urea solution and the filling level in the reducing-agent storage vessel 10. Moreover, the signals from a temperature sensor, which is arranged upstream o f the reduction catalytic converter 8, and from an exhaust-gas measurement pick-up, e.g. an NOx sensor, which is arranged downstream of the reduction catalytic converter 8, are transmitted to the metering control unit 9.

The metering control unit 9 controls an electromagnetic metering valve 15 to which, if necessary, urea solution is fed, via a feed line 16, from the reducing-agent storage vessel 10 with the aid of the reducing-agent pump 11. A pressure sensor 18, which records the pressure in the metering system and emits a corresponding signal to the metering control unit 9, is fitted into the feed line 16. The injection of the urea solution by means of the metering valve 15 takes place into the exhaust pipe 4 upstream of the reduction catalytic converter 8.

When the internal-combustion engine 1 is operating, the exhaust gas flows through the exhaust pipe 4 in the direction indicated by the arrow.

The metering control unit 9 is connected to the engine control unit 6 for reciprocal data transfer via an electrical bus system 17. The operating parameters which are relevant for calculation of the quantity of urea solution that is to be metered, such as for example engine speed, air mass flow, fuel mass flow, control travel of an injection pump, exhaust-gas mass flow, operating temperature, charge-air temperature, start of injection, etc., are transmitted to the metering control unit 9 via the bus system 17.

Working on the basis of these parameters and the measured values for the exhaust-gas temperature and the NOx content, the metering control unit 9 calculates the quantity of urea solution that is to be injected and transmits a corresponding electrical signal to the metering valve 15 via an electrical connecting line 23. The urea is hydrolyzed and mixed as a result of being injected into the exhaust pipe 4. The catalytic reduction of the NOx in the exhaust gas to form $N_2$ and $H_2O$ takes place in the catalytic converter units.

The metering valve 15 for introducing the urea solution into the exhaust pipe 4 substantially corresponds to a standard low-pressure fuel injection valve which, for example, is secured releasably in a valve-holding device that is fixedly connected to a wall of the exhaust pipe 4.

FIG. 2A shows a typical ceramic pressure-sensor diaphragm 181, which is circular in cross section, belonging to the pressure sensor 18, from the side which is remote from the pressurized medium (i.e., reducing agent). FIG. 2B shows this ceramic pressure-sensor diaphragm 181 in section. For reasons of chemical stability, sensor elements made from $Al_2O_3$ ceramic are particularly suitable for pressure measurements carried out in aqueous urea solution. These sensor elements comprise a ceramic shaped part with integrated sensor diaphragm 181. A resistor network 182 is applied to the sensor membrane 181 using thick-film technology. The network includes the sensor and calibration resistors. The measurement principle is based on the effect of the change in resistance when the sensor membrane is mechanically stressed (piezoresistivity). To compensate for temperature dependencies, additional temperature-dependent resistors may be provided.

Additional electrical resistors 183 are added for the purpose of heating the sensor diaphragm 181. The same technique is used to apply the additional electrical resistors 183. Sufficient free areas are available on the sensor diaphragm 181 for these electrical heating resistors 183 to be applied with a suitable geometry and output. In the case of applications with little demand for heating power (less than 1 watt), direct heating is also possible, by applying the on-board voltage (approx. 14 volts) instead of the reference voltage of usually 5 volts directly to the sensor resistor.

The sensor diaphragm 181 offers ideal conditions for this type of electrical heating, since $Al_2O_3$ ceramic has a high thermal conductivity and, moreover, the sensor diaphragm 181 is in principle very thin. The sensor diaphragm 181 therefore represents the optimum electrical insulation of the electrical heating from the heated aqueous urea solution.

The electrical heating resistors 183 and the sensor resistor network 182 are connected via connection pins and connection lines 184 to evaluation electronics or a heating actuation means, which is preferably integrated in the metering control unit 9. The sensor element can also be connected to the metering control unit 9 by means of bonding wires or by direct soldering.

FIG. 3 shows a section through a part of the pump module housing 19 with integrated pressure sensor 18. The pressure sensor 18 is in this case sealed in the housing 19 by means of an 0-ring seal 20. Reducing agent passes from the reducing-agent pump 11, via the inlet 21, to the pressure-sensor diaphragm 181 of the pressure sensor 18. The metering valve 15 is supplied with reducing agent via a hose connection 22. The flow of the reducing agent is indicated by an arrow.

When the internal-combustion engine is started up, the metering control unit 9 checks that each individual component of the reducing-agent metering system is ready for use. To this end, the temperature is measured at the pressure sensor 18. If the temperature of the pressure-sensor diaphragm 181 is sufficiently low for it to be likely that the pressure sensor will have frozen, the sensor heating is activated, i.e. a voltage is applied to the electrical heating resistors 183.

Because of high temperature gradients in the pressure-sensor diaphragm during a heating phase, with conventional pressure sensors it is impossible to measure either the pressure or the temperature during this phase. After a fixed time, the heating is switched off and the temperature is measured again. From the change in temperature, it is then possible to unambiguously determine whether reducing agent has been in the frozen state or may even still be partially frozen. In the latter case, after a short waiting time, precisely the melting point of the reducing agent is established at the pressure sensor. This state can be used in order to calibrate the sensor very accurately to the melting point, in a self-teaching function, by storing a correction value in a nonvolatile memory of the metering control unit 9. The heating operation is repeated until the volume of reducing agent in the pressure sensor has completely thawed. If the temperature measurement can be carried out continuously during the heating phase, it is also possible, by evaluating the temperature change per unit time, for both the melting point and the time of complete thawing of the volume of the reducing agent in the sensor to be determined.

If the temperature of the sensor diaphragm is definitely above the freezing point of the reducing agent, the pressure signal is checked for plausibility and the system is started up without sensor heating. The readiness of these components for operation at low temperatures can be monitored by evaluating the reaction of the pressure signal to pump and metering valve actuation.

Since the piezoresistive pressure sensor does not allow correct pressure measurement during and immediately after the heating phase, on account of excessively high temperature gradients, the sensor heating is only activated for the thawing phase. To prevent the sensor from freezing at low temperatures while the reducing-agent metering system is operating, the pressure sensor is constructed with sufficient thermal insulation and is kept above the freezing point of the reducing agent used by waste heat from reducing-agent pump, power electronics and any heating of the feed lines (e.g. hose heating).

In the exemplary embodiment described in accordance with FIG. 3, the reducing-agent pump 11 and the pressure sensor 18 form a common assembly, in order to reduce the costs for housing parts and lines and also to lower installation outlay. However, it is also possible for the reducing-agent pump 11 and the pressure sensor 18 to be designed as separate functional units.

It will be understood by those of skill in the pertinent art that it is also possible for the functions of the metering control unit 9 for the reducing-agent metering system to be integrated in the engine control unit 6 of the internal-combustion engine.

I claim:

1. A device for exhaust gas aftertreatment by selective catalytic reduction of nitrogen oxides in the exhaust gas of an internal-combustion engine operating with excess air, comprising:

a reduction catalytic converter for cleaning the exhaust gas;

a reducing agent vessel for storing a reducing agent to be injected into the exhaust gas, and a reducing agent pump communicating with said reducing agent vessel for delivering the reducing agent;

a metering valve communicating with said reducing-agent pump for introducing the reducing agent into the exhaust gas upstream of said reduction catalytic converter in a flow direction of the exhaust gas;

a metering control unit for controlling an introduction of the reducing agent according to demand; and an electrically heatable pressure sensor for recording a pressure of the reducing agent connected to said metering control unit, said pressure sensor having a pressure-sensor diaphragm and electrical heating resistors for heating said pressure sensor disposed on said pressure sensor membrane.

2. The device according to claim 1, which comprises electrical resistors for recording a temperature of the reducing agent disposed on said pressure sensor diaphragm of said pressure sensor.

3. The device according to claim 1, wherein said sensor membrane comprises an $Al_2O_3$ ceramic.

4. The device according to claim 1, wherein said pressure sensor is arranged in a feed line connecting said reducing agent pump to said metering valve.

5. The device according to claim 1, wherein said pressure sensor and said reducing-agent pump are combined to form a structural unit within a common housing.

6. A method for exhaust-gas aftertreatment by selective catalytic reduction of nitrogen oxides in the exhaust gas of an internal-combustion engine operating with excess air, the method which comprises:

delivering a liquid reducing agent from a reducing-agent vessel with a reducing-agent pump and, under certain operating states of the internal-combustion engine, metering the reducing agent into the exhaust gas upstream of a reduction catalytic converter with a metering valve;

recording a pressure of the reducing agent with a pressure sensor having a pressure-sensor diaphragm; and upon determining that a temperature of the pressure sensor lies close to or below a freezing point of the reducing agent, heating the pressure sensor with electrical heating resistors disposed on the pressure-sensor diaphragm of the pressure sensor.

7. The method according to claim 6, which comprises recording the temperature of the pressure sensor with the electrical heating resistors on the pressure-sensor diaphragm.

8. The method according to claim 6, which comprises recording the temperature of the pressure sensor with additional electrical resistors on the pressure-sensor diaphragm.

* * * * *